United States Patent
Xiao et al.

(10) Patent No.: US 12,293,217 B2
(45) Date of Patent: May 6, 2025

(54) LOAD BALANCING WITH MULTI-LEADER ELECTION AND LEADERSHIP DELEGATION

(71) Applicant: Dell Products L.P., Round Rock, TX (US)

(72) Inventors: Pan Xiao, Chengdu (CN); Xuhui Yang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 496 days.

(21) Appl. No.: 17/723,976

(22) Filed: Apr. 19, 2022

(65) Prior Publication Data

US 2023/0305885 A1  Sep. 28, 2023

(30) Foreign Application Priority Data

Mar. 24, 2022 (CN) .......................... 202210308542.X

(51) Int. Cl.
*G06F 9/48* (2006.01)
(52) U.S. Cl.
CPC .................. *G06F 9/4843* (2013.01)

(58) Field of Classification Search
CPC ................. G06F 9/4843; G06F 9/5027; G06F 2209/509; G06F 9/5083
See application file for complete search history.

(56) References Cited

U.S. PATENT DOCUMENTS

| | | | | |
|---|---|---|---|---|
| 2013/0174174 A1* | 7/2013 | Jung | ..................... | G06F 9/5072 718/104 |
| 2018/0293111 A1* | 10/2018 | Chen | ................... | H04L 67/1008 |
| 2020/0310394 A1* | 10/2020 | Wouhaybi | ........... | H04L 67/1051 |
| 2023/0195522 A1 | 6/2023 | Xiao et al. | | |

* cited by examiner

*Primary Examiner* — Sisley N Kim
(74) *Attorney, Agent, or Firm* — Jackson Walker L.L.P.

(57) ABSTRACT

A load balancing method for use in conjunction with an application or service provided by a distributed computing system may begin by electing, from a group of participants, a leader for each of a plurality of tasks associated with the application or service. Responsive to detecting a signal or some other indication to run a particular task, the elected leader of the particular task may delegate responsibility to run the particular task to a particular participant. The particular participant, upon subsequently discovering that responsibility for the particular task has been delegated to it, responds by running the particular task. In some embodiments, the elected leader for a task may delegate responsibility for running the task to a least-loaded participant.

18 Claims, 2 Drawing Sheets

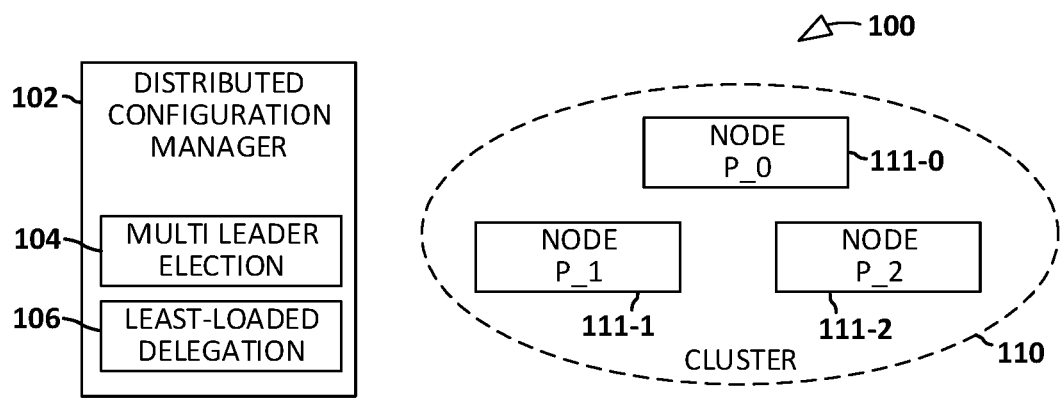
FIG. 1
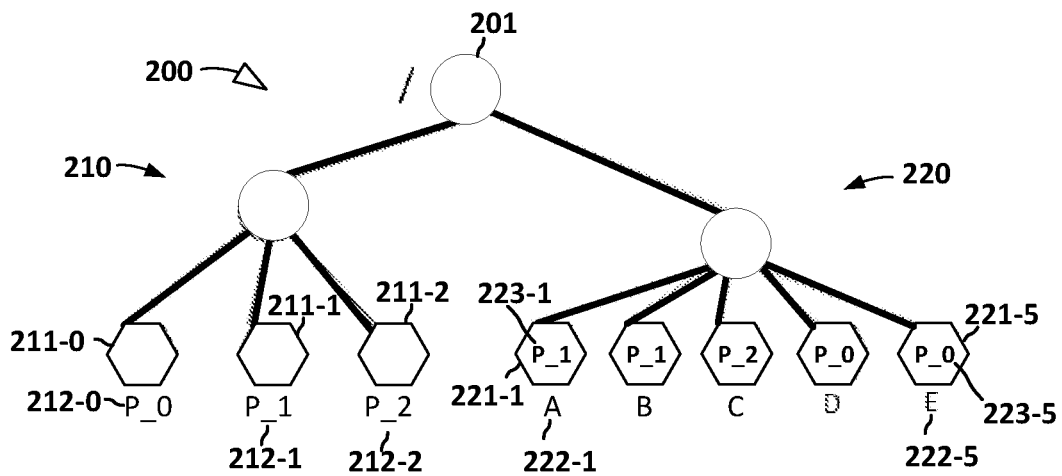
FIG. 2
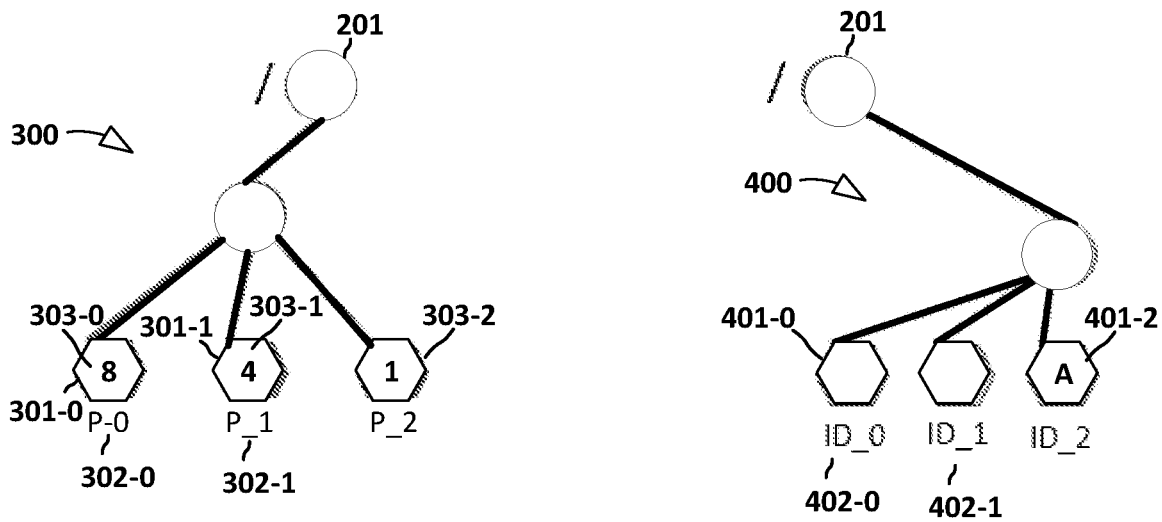
FIG. 3
FIG. 4

LOAD BALANCING WITH MULTI-LEADER ELECTION AND LEADERSHIP DELEGATION

TECHNICAL FIELD

The present disclosure relates to information handling systems and, more particularly, load balancing in distributed information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented as distributed computing systems or, more simply, clusters, in which a group of nodes, sometimes referred to herein as cluster nodes to distinguish them from the nodes of tree data structures also described herein, are configured to run tasks associated with an application or service provided by the cluster. A cluster may implement a distributed configuration service, such as an Apache ZooKeeper server, to provide or support configuration management, data synchronization, and naming service functionality for the cluster. Each cluster node may constitute a distinct information handling system, some or all of which may have similar or equivalent compute and storage resources and capabilities. The distributed configuration service may support any of various leader election algorithms to identify one of a potentially large number of eligible cluster nodes to oversee the execution of a distributed task. While conventional leader election algorithms may be suitable for their intended purpose, i.e., electing a leader for a task, they may fail to consider or achieve a desirable workload distribution within the cluster.

SUMMARY

In accordance with subject matter disclosed in the following description, a load balancing method for use in conjunction with an application or service provided by a distributed computing system may begin by electing, from a group of participants, a leader for each of a plurality of tasks associated with the application or service. In some embodiments, the electing step may include a multi-leader election process that elects a leader for each of a plurality of tasks wherein each participant is the leader of N or N+1 tasks, where N is a non-negative integer determined by the number of tasks, T, and the number of participants, P. In at least one embodiment, if P=T, each participant is leader of 1 task. If P>T, i.e., more participants than tasks, every participant is leader of either 0 or 1 tasks. If T>P, each participant is leader of either int[T/P] or int[T/P]+1 tasks. An exemplary multi-leader election resource is described in co-pending U.S. application Ser. No. 17/562,094 filed 27 Dec. 2021, which is incorporated by reference herein in its entirety.

Each participant may be a distinct information handling system, such as a rack mount server. The group of participants may correspond to the nodes of a cluster. In some embodiments, the cluster nodes may be implemented with one or more hyper-converged infrastructure (HCI) appliances.

Responsive to detecting a signal or some other indication to run a particular task, the elected leader of the particular task may delegate responsibility to run the particular task to a particular participant. The particular participant, upon subsequently discovering that responsibility for the particular task has been delegated to it, responds by running the particular task. In some embodiments, the elected leader for a task may delegate responsibility for running the task to a least-loaded participant, i.e., a participant with a loading that is not greater than the loading of any other participant in the cluster.

In embodiments that employ ZooKeeper or another distributed configuration service, each participant may create a corresponding node in two tree data structures referred to herein as the load tree and the delegation tree. The value of each load tree node may be periodically updated so that each load tree node has a value indicative of current or very recent loading of the corresponding participant. The loading values for each node may be rounded or otherwise estimated to prevent excessive delegation changes due to comparatively minor changes in loading. To illustrate, loading values from 0 to 99 may be divided by 10 and truncated to produce a loading indicator from 0 to 9. Load tree nodes may be created with an ephemeral attribute wherein ephemeral nodes are automatically removed from the load data structure when the corresponding participant crashes or quits.

The elected leader of a task may store a value indicative of the delegated task into the delegation tree node of the responsible participant, i.e., the participant that is delegated responsibility for the task. The delegation tree nodes may be configured with a watch feature that signals the corresponding participant when the node's value changes. Accordingly, when a task's elected leader stores a value identifying a task in the delegation tree of the responsible participant, the responsible participant will detect the change in value and may begin to run the applicable task.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a highly reliable distributed computing system;

FIG. 2 illustrates a tree data structure maintained by a distributed configuration manager;

FIG. 3 illustrates a load tree data structure;

FIG. 4 illustrates a delegation tree data structure;

DETAILED DESCRIPTION

Figure 5:
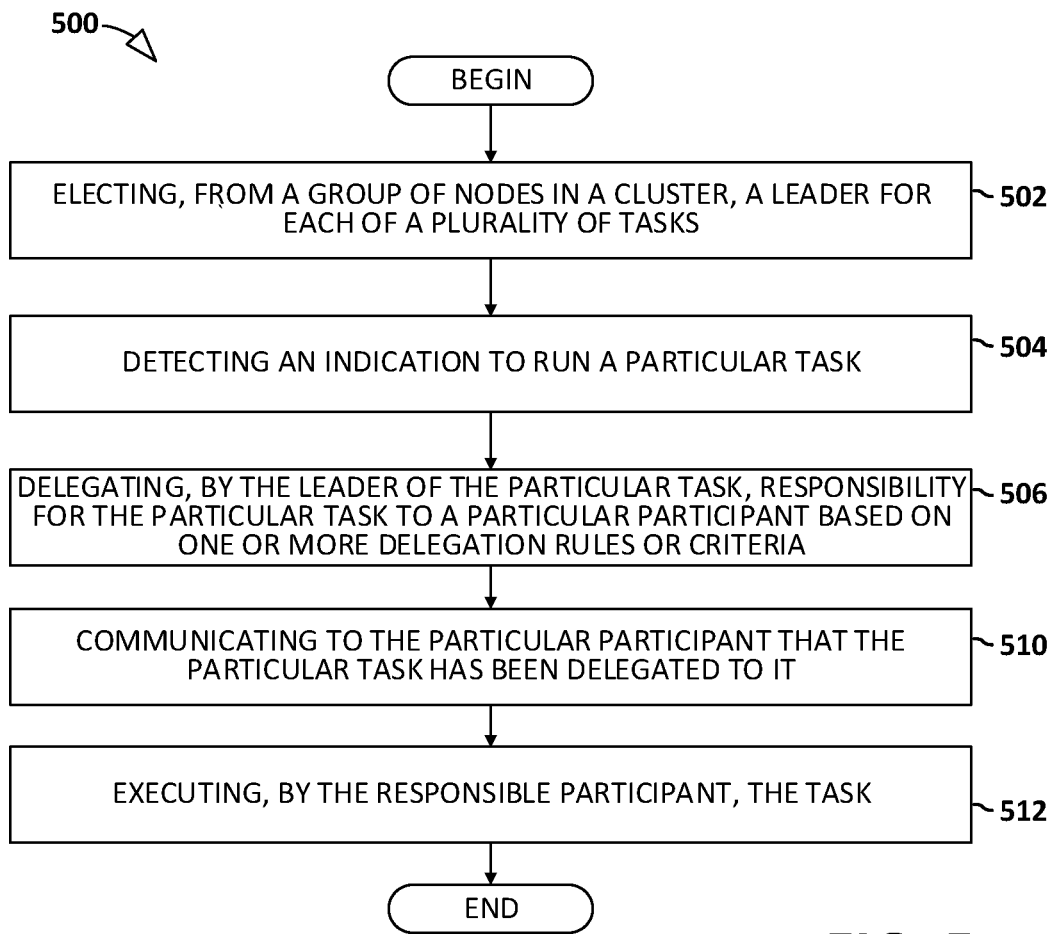
FIG. 5 illustrates a flow diagram of a multi-leader election and delegation method.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling system 100 implemented as a highly reliable distributed computing system that includes a cluster 110 comprised of three distinct nodes, 111-0 through 111-2, configured to provide an application or service.

Each node 111 may correspond to a distinct information handling resource implemented in hardware, software, or a combination of both. In at least one embodiment, each node 111 comprises a server-class computing system such as a rackmount server. In some embodiments, each node 111 includes the same or substantially similar hardware and operating system configurations.

Each node 111 may include converged infrastructure (CI) or hyper-converged infrastructure (HCI) resources, not explicitly depicted, that facilitate integration and centralized management of the individual compute, storage, and networking resources of each node 111. In at least one embodiment, nodes 111 may be implemented with a VxRail appliance from Dell Technologies. Although FIG. 1 illustrates cluster 110 with three nodes 111, those of ordinary skill in the field will appreciate that cluster 110 may include more or fewer nodes 111.

As suggested by its name, distributed configuration manager 102 provides centralized configuration management for cluster 110. Distributed configuration manager 102 may be implemented with, or may include features of, an Apache ZooKeeper server. In such embodiments, distributed configuration manager 102 supports and manages one or more data structures, including but not necessarily limited to one or more tree data structures, that implement a hierarchical name space, analogous to a file system, to facilitate deployment and management of cluster 110. In such embodiments, each node 111 may include a client resource for interacting with these data structures. Consistent with Apache Zoo- Keeper terminology, cluster nodes, such as the nodes 111 illustrated in FIG. 1, may be referred to herein simply as nodes while tree structure nodes associated with tree data structures, discussed below, maintained by distributed configuration manager 102 may be referred to herein as znodes. In addition, because each node 111 may contribute to or participate in the deployment of an application or service, the nodes 111 may be referred to herein as participants.

An application or service associated with a cluster such as cluster 111 may encompass a plurality of distinct tasks. As suggested previously, it may be desirable in such deployments to provide one or more resources to identify and designate, i.e., elect a specific node as the leader of each task. When it becomes necessary or desirable to execute a task, the elected leader for that task performs operations necessary to execute the task.

The illustrated distributed configuration manager 102 includes a multi-leader election resource 104 that elects task leaders in an efficient and reliable manner. In at least one embodiment, multi-leader election resource 104 ensures an optimally uniform distribution of leaders among the cluster nodes. For purposes of this disclosure, an optimally uniform distribution of leaders may refer to a distribution in which each participant is designated as the elected leader of either N or N+1 tasks, where N is a non-negative integer determined by the number of participants (P) and the number of tasks (T). For example, if T=P, each participant is the elected leader of one task. If there are more participants than tasks, i.e., P>T, each participant is the elected leader of either 0 or 1 task. If there are more tasks than participants, i.e., T>P, then each participant is the elected leader of either K or K+1 tasks, where K=int[T/P], and int[x] is a floor function that returns the greatest integer less than or equal to x.

As suggested previously, the implementation of an efficient and reliable multi-leader election process may not ensure an efficient workload distribution within cluster 111. Distributed configuration manager 102 illustrated in FIG. 1 includes a delegation resource to address this concern. More specifically, the distributed configuration manager 102 illustrated in FIG. 1 includes a least-loaded delegation resource 106 that provides a reliable and light-weight load management tool for distributed tasks.

Turning now to FIGS. 2, 3, and 4, exemplary tree data structures for implementing multi-leader election resource 104 (FIG. 2) and least-loaded delegation resource 106 (FIG. 3 and FIG. 4) are illustrated.

FIG. 2 illustrates a tree data structure 200 maintained by distributed configuration manager 102. In the following description, the nodes of tree data structure 200 are referred to as znodes consistent with Apache ZooKeeper terminology that will be familiar to those of ordinary skill in the field. However, the use of Apache ZooKeeper terminology in the following description is illustrative, rather than restrictive and does not limit disclosed subject matter to implementations that employ Apache ZooKeeper.

The tree data structure 200 of FIG. 2 includes a root node 201 and two sub-trees of root node 201. The two sub-trees depicted in FIG. 2 include a first sub-tree, referred to herein as participant tree 210, and a second sub-tree, referred to herein as leader tree 220. The participant tree 210 illustrated in FIG. 2 includes a participant znode 211 corresponding to each node 111 in FIG. 1. Each participant znode 211 has a unique identifier 212, which may be determined by distributed configuration manager 102. As an example, in embodiments that include Apache ZooKeeper within distributed configuration manager 102 (FIG. 1), the generation of unique identifiers 212 may be facilitated by a sequential feature that facilitates the creation of unique identifiers for each node by appending an integer to a base portion of the unique identifier and subsequently incrementing the integer.

The leader tree 220 illustrated in FIG. 2 includes a znode 221 corresponding to each of a plurality of tasks associated with an application or service provided by cluster 110 (FIG. 1). Each leader tree node 221 includes a unique identifier 222 of the applicable task and a value 223 indicating the participant node that has been elected as leader of the applicable task. Thus, for example, the value (223-1) P_1 of znode 221-1 indicates that the node 111-1 (FIG. 1) is the elected leader of the task A associated with the znode's unique identifier 222-1.

FIG. 2 illustrates an example in which a cluster of three participants (P_0, P_1, and P_2) is responsible for performing 5 tasks (A, B, C, D, and E) associated with an application or service. FIG. 2 depicts a state of participant tree 210 and leader tree 220 after a multi-leader election process has been performed and completed. As a result of the leader election process, the elected leader of tasks A and B is P–1, as indicated by the values 223-1 and 223-2 of leader nodes 222-1 and 222-2, the elected leader of task C is P–2, and so forth. Consistent with at least some embodiments of multi-leader election resource 104, each participant is the elected leader of either 1 or 2 tasks.

FIG. 3 and FIG. 4 illustrate additional tree data structures for implementing a real time load-based delegation for running the applicable tasks. FIG. 3 illustrates a load tree 300 including znodes 301, each of which is associated with a unique identifier 302 and a load value 303. The values 303 in each load tree znode 301 are a quantitative indicator of the loading of the corresponding node 111 (FIG. 1). In the illustrated example, valid loading values may be in the range of 0 to 9 wherein a value of 9 indicates more loading than a value of 8, a value of 8 indicates more loading than a value of 7, and so forth. Each node 111 may periodically run a background process to update loading values 303 in each of the znodes 301. The loading values may be used to delegate the running of a task to a particular participant. In embodiments that employ least-loaded delegation, for example, the next task to be delegated would be delegated to participant P_2 as the least-loaded participant. In at least some embodiments, loading tree znodes 301 are configured with an ephemeral setting that causes the znode to be removed if the corresponding participant crashes or quits.

FIG. 4 illustrates an exemplary delegation tree 400 including a znode 401 corresponding to each participant. The value of a delegation znode 401 is set when a task's elected leader delegates the corresponding task to a particular participant using the least-loaded criteria or some other criteria. As depicted in FIG. 4, for example, participant P_1, which is the elected leader of task A, determines, responsive to determining that task A should be executed, which of the participants is least loaded based on the loading values 303 in FIG. 3. Participant P_1 then delegates the actual execution of task A to participant P_2 by setting the value of delegation znode 401-2 to A. In at least some embodiments, the delegation znodes 401 are configured with a watch setting the messages the applicable participant whenever the value of the corresponding delegation znode 401 changes. Thus, when participant P_1 sets the value of delegation znode 401-2 to "A," participant P_2 detects the change in values and responds by running the task indicated in the value of its delegation znode 401-2.

Listed below is exemplary code that the elected leader of a particular task may execute when the leader detects that the corresponding task should be executed. This exemplary code calls a delegateTask function or subroutine that calls an idleNode function to determine which participant is currently least-loaded and then delegates the running of the applicable task to the least-loaded participant by setting the value of the delegation znode corresponding to the least-loaded participant to indicate the task to be run.

```
while(True):
{
    idleNode = findMostIdleNode( )
    delegateTask(idleNode, taskName)
    sleep(n_sec)
}
```

The participant to which a task has been delegated detects a change of value in its delegation znode 401 and responds by running the task. Exemplary code for this process is set forth below.

```
callBackFun( ):
{
    taskName = getTaskName( )
    runTask(taskName)
    return
}
```

Referring now to FIG. 5, a multi-leader election and delegation method 500 is illustrated in flow diagram format. The illustrated method 500 include electing (block 502), from a group of cluster nodes or participants, a leader for each of a plurality of tasks. The cluster may be configured to support a distributed application or service and the cluster nodes may be employed to run tasks associated with the application or service. When the elected leader for a particular task detects (block 504) that it is necessary or desirable to execute the task, the leader may perform a delegation process, such as a load-based delegation described herein, and delegate (block 506) the task to the most appropriate participant, such as the least-loaded participant. In some embodiments, the delegation determination may be facilitated by a load tree data structure that includes a node for each participant wherein each node has a value indicative of the node's current or recent loading. In at least some embodiments, the delegation may be communicated (block 510) to the responsible participant by employing a delegation tree with a node for each participant wherein the delegation tree nodes are configured with a watch attribute that causes each node to inform its corresponding participant when a value of the node changes. Thus, when a task's elected leader delegates a task to a participant, the leader stores a value identifying the delegated task in the delegation tree node of the responsible participant. The responsible participant will detect that the value of its delegation tree node has changed and may then determine, based on the value stored in the delegation tree node, and execute the applicable task (block 512). In this manner, a multi-leader election process may be augmented with a load based delegation process to simultaneously balance the distribution of leadership roles among the participants and balance the loading of each participant.

Figure 6:
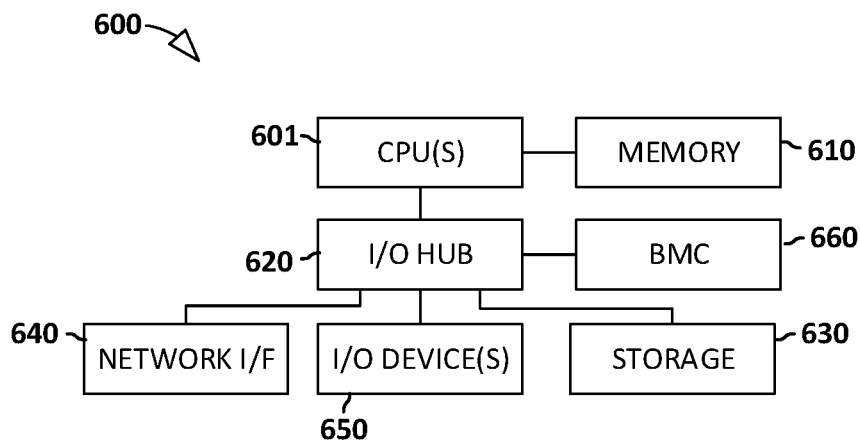
FIG. 6 illustrates an exemplary information handling system.

Referring now to FIG. 6, any one or more of the elements illustrated in FIG. 1 through FIG. 4 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A load balancing method, comprising:
   electing, from a group of participants, a leader for each of a plurality of tasks, wherein each of the participants comprises an information handling resource;
   responsive to detecting an indication to run a particular task from the plurality of tasks, delegating, by a leader assigned to the particular task, responsibility to run the particular task to a particular participant;
   responsive to detecting said delegating of the particular task, running, by the particular participant, the particular task;
   creating, by each of the group of participants, a corresponding node in a load data structure and a corresponding node in a delegation data structure; and periodically updating, by each of the group of participants, a load indicator for the corresponding node in the load data structure.

2. The load balancing method of claim 1, wherein said delegating comprises delegating responsibility to run the particular task to a least loaded participant, wherein a loading of the least loaded participant is less than or equal to a loading of every other participant in the group of participants.

3. The load balancing method of claim 1, wherein the load indicator identifies one of a plurality of load ranges wherein each load range is associated with a range of loading values.

4. The load balancing method of claim 1, wherein said delegating includes:
determining, from the load data structure, a participant identifier of the least loaded participant;
identifying, in the delegation data structure, a node corresponding to the participant identifier; and
setting a value of the node to identify the particular task.

5. The load balancing method of claim 1, wherein the creating of a corresponding node in the delegation data structure includes enabling a watch function of the node, wherein the watch function communicates an indication of a change of value of the corresponding node to the corresponding participant.

6. The load balancing method of claim 1, wherein the creating of a corresponding node in the load data structure comprises creating the corresponding node as an ephemeral node, wherein ephemeral nodes are automatically removed from the load data structure when the corresponding participant crashes or quits.

7. The load balancing method of claim 1, wherein at least one of the load data structure and the delegation data structure comprises a tree data structure.

8. The load balancing method of claim 1, wherein said electing comprises electing the leader for each of the plurality of tasks wherein a number of tasks to which any participant is elected as leader differs by no more than one.

9. The load balancing method of claim 1, wherein each of the group of participants is associated with a corresponding node resource of a cluster comprising one or more information handling resources.

10. An information handling system, comprising:
a central processing unit (CPU); and
a non-transitory computer readable medium, accessible to the CPU, including processor executable instructions that, when executed by the CPU, cause the system to perform load balancing operations, wherein the load balancing operations include:
electing, from a group of participants, a leader for each of a plurality of tasks, wherein each of the participants comprises an information handling resource;
responsive to detecting an indication to run a particular task from the plurality of tasks, delegating, by a leader assigned to the particular task, responsibility to run the particular task to a particular participant;
responsive to detecting said delegating of the particular task, running, by the particular participant, the particular task;
creating, by each of the group of participants, a corresponding node in a load data structure and a corresponding node in a delegation data structure; and
periodically updating, by each of the group of participants, a load indicator for the corresponding node in the load data structure.

11. The information handling system of claim 10, wherein said delegating comprises delegating responsibility to run the particular task to a least loaded participant, wherein a loading of the least loaded participant is less than or equal to a loading of every other participant in the group of participants.

12. The information handling system of claim 10, wherein the load indicator identifies one of a plurality of load ranges wherein each load range is associated with a range of loading values.

13. The information handling system of claim 10, wherein said delegating includes:
determining, from the load data structure, a participant identifier of the least loaded participant;
identifying, in the delegation data structure, a node corresponding to the participant identifier; and
setting a value of the node to identify the particular task.

14. The information handling system of claim 10, wherein the creating of a corresponding node in the delegation data structure includes enabling a watch function of the node, wherein the watch function communicates an indication of a change of value of the corresponding node to the corresponding participant.

15. The information handling system of claim 10, wherein the creating of a corresponding node in the load data structure comprises creating the corresponding node as an ephemeral node, wherein ephemeral nodes are automatically removed from the load data structure when the corresponding participant crashes or quits.

16. The information handling system of claim 10, wherein at least one of the load data structure and the delegation data structure comprises a tree data structure.

17. The information handling system of claim 10, wherein said electing comprises electing the leader for each of the plurality of tasks wherein a number of tasks to which any participant is elected as leader differs by no more than one.

18. The information handling system of claim 10, wherein each of the group of participants is associated with a corresponding node resource of a cluster comprising one or more information handling resources.

* * * * *